United States Patent
Lai et al.

(10) Patent No.: US 6,463,672 B1
(45) Date of Patent: Oct. 15, 2002

(54) MITIGATION OF SPACECRAFT CHARGING BY MEANS OF IONIZED WATER VAPOR

(75) Inventors: Shu T. Lai, Burlington; Edmond Murad, Newton, both of MA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/609,946

(22) Filed: Jul. 3, 2000

(51) Int. Cl.[7] ............................................... F26B 19/00
(52) U.S. Cl. ..................... 34/60; 34/61; 34/68; 34/517; 34/516; 34/380; 244/1 A; 136/243; 136/244; 136/256; 136/259; 136/292
(58) Field of Search ........................ 34/380, 516, 517, 34/60, 61, 68; 244/1 A; 136/243, 244, 256, 259, 292

(56) References Cited

U.S. PATENT DOCUMENTS

| | | | | | |
|---|---|---|---|---|---|
| 4,691,159 | A | * | 9/1987 | Ahrens et al. | 323/222 |
| 4,899,269 | A | * | 2/1990 | Rouzies | 363/41 |
| 5,394,075 | A | * | 2/1995 | Ahrens et al. | 320/39 |
| 5,444,358 | A | * | 8/1995 | Delepaut | 323/222 |
| 5,451,858 | A | * | 9/1995 | Van Duyne et al. | 323/281 |
| 5,594,325 | A | * | 1/1997 | Manner | 323/282 |
| 5,628,831 | A | * | 5/1997 | Williamson et al. | 134/1.1 |
| 6,177,629 | B1 | * | 1/2001 | Katz | 136/292 |
| 6,248,950 | B1 | * | 6/2001 | Hoeber et al. | 136/251 |
| 6,260,808 | B1 | * | 7/2001 | Bodeau et al. | 244/173 |

* cited by examiner

Primary Examiner—William C. Doerrler
Assistant Examiner—Mark Shulman
(74) Attorney, Agent, or Firm—William G. Auton

(57) ABSTRACT

The process of mitigation of spacecraft surface charging using ionized water vapor is used, since it helps taking excess surface electrons away from a spacecraft surface, leaving practically no residue after complete evaporation.

4 Claims, 2 Drawing Sheets

MITIGATION OF SPACECRAFT CHARGING BY MEANS OF IONIZED WATER VAPOR

STATEMENT OF GOVERNMENTAL INTEREST

The invention described herein may be manufactured and used by or for the Government for governmental purposes without the payment of any royalty thereon.

BACKGROUND OF THE INVENTION

The invention relates generally to systems for protecting spacecraft from charging, and more specifically it relates to a new kind of system for the mitigation of spacecraft surface charging using ionized water vapor. The use of ionized water vapor has many advantages over other methods: much lower cost, efficient electron scavenger, efficient evaporation rate helps taking excess surface electrons away, leaving practically no residue after complete evaporation.

Charging of spacecraft in the energetic plasma environment in space may be hazardous to the health of on-board electronics. It may affect telemetry, navigation, operation and even the survivability of spacecraft, and degrade scientific measurements. Spacecraft charging may be due to natural or artificial causes. Natural charging is due to the interaction between a spacecraft and its space plasma environment. Artificial charging is due to beam emissions, for example. In the geosynchronous environment, a spacecraft is often charged negatively during eclipse.

The task of providing spacecraft radiation protection using technology is alleviated by the following U.S. Patents, the disclosures of which are incorporated herein by reference:

U.S. Pat. No. 5,594,325 issued to David Manner
U.S. Pat. No. 4,691,159 issued to Ahrens et al.
U.S. Pat. No. 4,899,269 issued to Rouzies
U.S. Pat. No. 5,394,075 issued to Ahrens et al.
U.S. Pat. No. 5,444,358 issued to Delepaunt
U.S. Pat. No. 5,451,858 issued to Van Duyne et al.

The above-cited references describe patented space radiation protection systems. The Manner patent describes the use of spacecraft power systems to mitigate spacecraft charging effects.

Geosynchronous spacecraft have a history of charging anomalies. Conventional passive protection measures are often complex and costly.

SUMMARY OF THE INVENTION

The present invention is a system for mitigating spacecraft charging by means of ionized water vapor. More specifically, when water vapor molecules are evaporating from charged spacecraft surfaces, the evaporation carries away the excess surface electrons.

Water molecules are effective charge scavengers. In the low atmospheric pressure (practically a vacuum) space environment, neutral and charged water droplets on the spacecraft surface evaporate rapidly, especially on the sunlit surface of the spacecraft. When the evaporating charged droplet radius diminishes to a critical rayleigh size, the droplet would burst into several smaller droplets and electrons are carried away by the smaller droplets.

In the present invention, we use ionized water vapor for mitigation, the water vapor comes out from a heated tray through a very fine mesh instead of from a single nozzle. The mesh holes are of hundredth of a cm. in diameter or smaller. This method prevents the condensation of an expanding water jet into ice particles of substantial sizes. In addition, we use an ionization device to generate positively ionized water vapor. The water vapor ions return to the negatively charged spacecraft and neutralize the excess negative surface charge while the ionization electrons leave the spacecraft and carry away negative charges.

DETAILED DESCRIPTION OF THE PREFERRED EMBODIMENT

Figure 1:
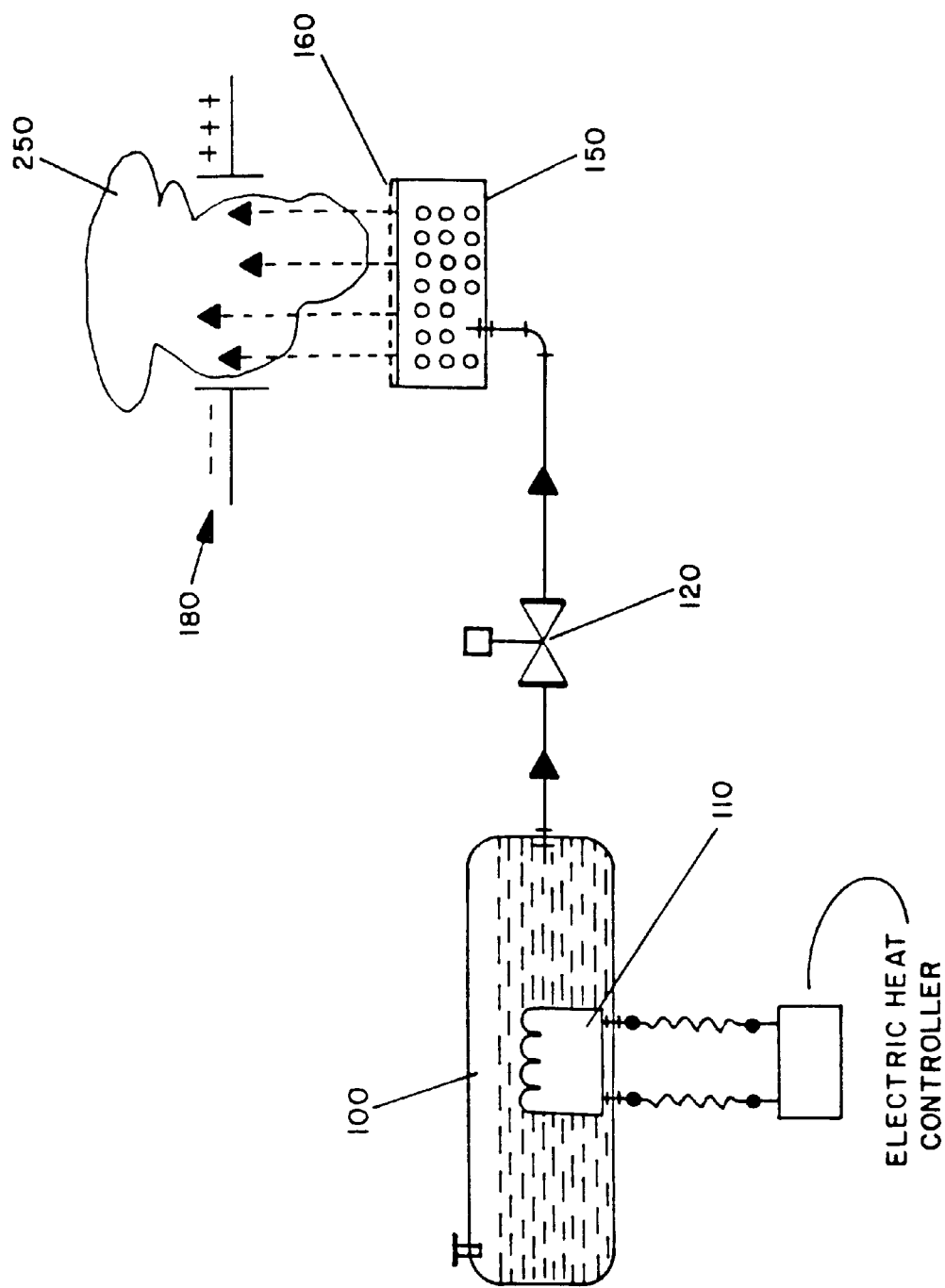
FIG. 1 illustrates the elements of the invention.

The present invention consists of a system for use of ionized water to neutralize spacecraft surface charge A schematic drawing of the invention is shown in FIG. 1. Water is stored in a container 100. There is a heating coil 110 inside. The heater coil 110 is capable of heating the water to temperatures up to or near boiling. The warm water flows along a tube through a valve 120 to the mesh vaporizer 150 and 160. The water vapor forms a cloud of warm water vapor at a distance of a few meters. A pair of electrodes 180 is placed near the surface of the mesh 160. The electrodes are capable of sustaining a discharge of a small current (10 milliamp, for example) at a voltage (100 Volts, for example) above the ionization energy of water.

The heated water vapor coming out of the mesh 160 would be ionized partially by the discharge. Some tiny ice molecules may form. The positively ionized water vapor and tiny ice molecules would float about in the vicinity of the spacecraft. The ionized fine water droplets and positively charged fine ice particles would be attracted by, commercial success of a form of packaging and "home in" towards, the negatively charged surfaces. There, the fine water vapor molecules accumulate on the surface. The impacts by the fine ice particles do no harm to the surfaces because each ice particle is very fine. The water vapor molecules and tiny ice particles accumulated on the negatively charged spacecraft surfaces neutralize some of the excess charges. Furthermore, the neutral water vapor acts as an electron scavenger and as they evaporate into small sizes, they burst into smaller droplets taking the electrons away.

The control knob 120 can be switched on or off by a remote command from the ground. When the negative charging level of the spacecraft reaches a certain level, the ground command can optionally turn on the mitigation device. When the level falls to a certain level, the ground command can optionally turn the mitigation device off. Alternatively, it can be turned on or off automatically by linking it to a charging sensor. When the sensor senses a critical charging level, it can send a command to turn the device on or off automatically.

Figure 2:
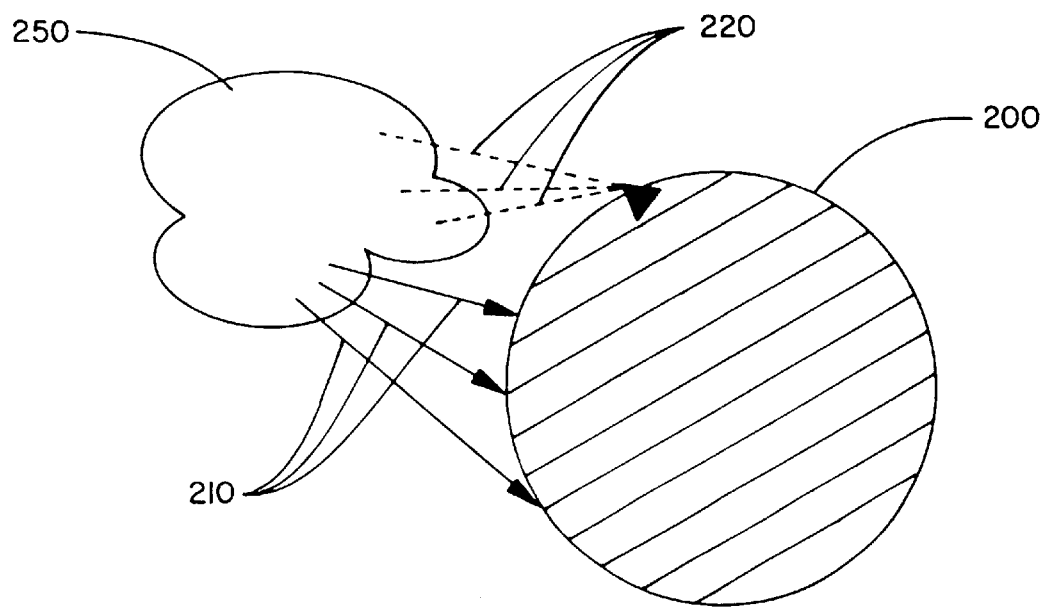
FIG. 2 illustrates the operation of the invention.

FIG. 2 shows how a mesh vaporizer 220 can produce an ionized water cloud 250 that will deposit positively charged water droplets 210 onto a satellite 200.

This invention has advantages over the existing method of ionized xenon gas. Although positive xenon ions returning to spacecraft surfaces can neutralize some of the excess negative charges, xenon does not act as a scavenger of excess electrons on the surfaces and hence it is less effective than water molecules for the mitigation. This invention represents a significant cost saving because water is much less expensive than xenon.

What is claimed is:

1. A process for mitigation of spacecraft charging using ionized water vapor, said process comprising the steps of:

spraying an ionized water vapor in a mist onto negatively charged spacecraft surfaces; and allowing molecules of the mist to pick up electrons and evaporate away with the electrons.

2. A system for mitigation of spacecraft surface charging using ionized water vapor, said system comprising:

a storage means containing ionized water vapor; and a means for spraying said ionized water vapor in a mist onto negatively charged spacecraft surfaces such that molecules of the mist pick up electrons and evaporate away with the electrons.

3. A system, as defined in claim 2, wherein said spraying means comprises:

a control valve which conducts a stream of water from said storage means at a predetermined rate;

a first heater which vaporizes the stream of water from the control valve into water vapor;

a spray head with a mesh which sprays said water vapor from said first heater; and a set of ionization electrodes which ionizes said water vapor from said spray head using an electric charge.

4. A system, as defined in claim 3, wherein said storage means comprises:

a tank containing a supply of water; and a second heater which heats said supply of water.

* * * * *